(12) United States Patent
Pinto Bascompte

(10) Patent No.: US 7,669,670 B2
(45) Date of Patent: Mar. 2, 2010

(54) PROCEDURE FOR INSTALLING HORIZONTAL DRAINS FOR UPTAKE OF SEA WATER

(75) Inventor: Domenec Pinto Bascompte, Fonollosa-Barcelona (ES)

(73) Assignee: Catalana De Perforacions, S.A., Fonollosa-Barcelona (ES)

( * ) Notice: Subject to any disclaimer, the term of this patent is extended or adjusted under 35 U.S.C. 154(b) by 0 days.

(21) Appl. No.: 11/666,018

(22) PCT Filed: Oct. 29, 2004

(86) PCT No.: PCT/ES2004/000480

§ 371 (c)(1),
(2), (4) Date: Jun. 14, 2007

(87) PCT Pub. No.: WO2006/045859

PCT Pub. Date: May 4, 2006

(65) Prior Publication Data

US 2008/0093123 A1    Apr. 24, 2008

(30) Foreign Application Priority Data

Oct. 21, 2004  (ES) .............................. 200402509

(51) Int. Cl.
*E21B 7/04*   (2006.01)
*E21B 7/12*   (2006.01)

(52) U.S. Cl. .............................. 175/61; 175/5; 175/53; 166/335; 166/50

(58) Field of Classification Search ............ 166/50, 166/335, 308.1, 308.6; 175/5, 61, 53
See application file for complete search history.

(56) References Cited

U.S. PATENT DOCUMENTS

| 2,981,332 | A | | 4/1961 | Miller et al. |
| 3,136,361 | A | * | 6/1964 | Marx .................... 166/308.1 |
| 5,040,601 | A | * | 8/1991 | Karlsson et al. ............ 166/278 |
| 5,280,825 | A | * | 1/1994 | Cholet ........................ 166/311 |
| 5,597,045 | A | | 1/1997 | Sass et al. |
| 6,095,719 | A | * | 8/2000 | Miya et al. ................. 405/127 |
| 6,422,318 | B1 | | 7/2002 | Rider |
| 2005/0061549 | A1 | * | 3/2005 | Evans et al. ................. 175/62 |

FOREIGN PATENT DOCUMENTS

| DE | 313 221 | 7/1919 |
| ES | 2 120 041 T | 10/1998 |
| ES | 2120041 T | 10/1998 |

OTHER PUBLICATIONS

International Search Report, (Apr. 7, 2005).

* cited by examiner

*Primary Examiner*—David J Bagnell
*Assistant Examiner*—Elizabeth C Gottlieb
(74) *Attorney, Agent, or Firm*—Collard & Roe, P.C.

(57) ABSTRACT

A procedure for the installation of horizontal drains for uptake of seawater of the type of those that use horizontal directional drilling (HDD) with widening by means of reamers and use of drilling muds for consolidation of the drilled galleries, and subsequent installation of drains, characterized in that the horizontal directional drilling (HDD), of single or multiple holes, is carried out from behind the coastline and directed towards the sea, crossing predetermined submerged productive strata; in the boreholes drilled, tubular drains are introduced, with grooves or holes only in stretches that correspond to predicted productive areas, remaining closed in the other sections; the space between the hole and the drain is sealed in the non-productive parts.

5 Claims, 6 Drawing Sheets

PROCEDURE FOR INSTALLING HORIZONTAL DRAINS FOR UPTAKE OF SEA WATER

CROSS REFERENCE TO RELATED APPLICATIONS

Applicant claims priority under 35 U.S.C. §119 of Spanish Application No. P2004 02509 filed Oct. 21, 2004. Applicant also claims priority under 35 U.S.C. §365 of PCT/ES2004/000480 filed Oct. 29, 2004. The international application under PCT article 21(2) was not published in English.

The present invention relates to a procedure of drain installation for the collection of sea water.

BACKGROUND OF THE INVENTION

At present, the collection of sea water for ends such as desalination, refrigeration processes, recreational and sports uses, etc., can be done by a variety of methods, of which the following stand out:

Collection by open sampling: directly from sea water, which is done by a submerged contact that enters the water to a predetermined distance, which depends on the physical characteristics of the marine environment and the sounding of the bottom. The submerged end of the conduct tube is equipped with an open head to allow direct entry of seawater by pumping from pumps installed on dry land.

Collections by means of vertical wells: wells of varying depth, that are drilled on dry land, penetrating underneath the surface of the freshwater-saltwater that exists in the profile of the coastline. The seawater penetrates through the pores in the granular rocky mass of the seabed to the land until reaching a hydrostatic equilibrium with the flow of freshwater from land that flows into the sea. The vertical wells for pumping seawater have to pass through this equilibrium surface to reach the saltwater for installation of the corresponding filter tube at the bottom, in which the pump will be placed that will pump these salt waters. In this case, the terrain acts as a natural filter, providing waters of excellent physical and chemical properties, at almost constant temperature throughout the year without being influenced by outside climatic conditions.

Both processes have their drawbacks. In the first case, the drawback is due to the direct collection of water, with the existence of elements in suspension and variations in temperature of the water. In the second case, depending on whether the extent of permeability of the substratum, pumps are needed with large dynamic decreases in the phreatic level, which will give rise to very deep pumping cones that could influence the flow of freshwater in the upper part of the aquifer used. This leads to a variation in the chemical composition of the pumped water, as well as substantially affecting the freshwater of the aquifer often used by others, provoking or accelerating the process of intrusion by the sea into the fresh water of the land. Also, in this case, the existence of deep pumping cones may give rise to water flows with a large gradient that could sweep fine material in the aquifer towards the pumping wells, increasing the turbidity and presence of swept solids in the pumped water, which would negatively affect the subsequent processes of filtration and treatment, making the general collection process more expensive.

In addition, in the event that large collection flows are required, batteries of well-spaced wells would be needed to avoid problems of dynamic pumping, and so a large surface would be needed, occupied by these batteries of wells, something which is inconvenient in tourist areas of the coast and where space is not readily available.

As a background of the invention, the German patent DE313221 is recognized, which discloses a procedure for placing subterranean tubes for different liquids, including drains, as well as equipment for the work.

In this patient, the method of horizontal directional drilling (HDD) is used to dig subterranean galleries, and the drain is introduced, protected with a sleeve that is withdrawn once installation is complete.

The problem of the procedure of this patent is, firstly, that the protective sleeve of the drain increases the material costs and manpower, as well as slowing down the speed with which the work is done.

In addition, the extra size needed for the protective sleeve increases the economic cost of the project.

Another problems lies in the fact that the drain installed according to this procedure may affect different phreatic levels that may have different contaminants, and even cause healthy strata to be affected by other contaminated ones; therefore, the collection of waters is not appropriate for recreational uses or desalination, in addition to the aforementioned negative effect of contamination of the healthy strata.

In addition, the system used does not consider any system for elimination of detritus from the sealing of the well, decreasing the performance of the drain.

Finally, in this patent, widening work was done through the introduction of a reamer from the opposite end to that starting point of the well. This suggests that the sludge from drilling will logically escape through the widened side, which when drilling towards the sea will be towards this side, and so the mud fluid will not be recovered and will pollute the sea.

DESCRIPTION OF THE INVENTION

The procedure of the invention comprises, after the appropriate hydrological and geotechnical studies of the viability and site of the productive sections or regions, the horizontal directional drilling (HDD), of one or more boreholes from the land in a zone close to the coastline, and directed towards the sea, passing through zones expected to provide sufficient permeability, both because of porosity and because of fracturing, to ensure at all times the replenishing of the marine aquifer to be exploited, and until reaching the seabed in a final slightly upward section.

The HDD system allows the drill head to be guided to drill very long holes (more than 600 m) within the strata of the productive aquifer. This technology allows holes to be drilled from the land which come out in the sea without affecting the intermediate section. For the localization of the drill head, magnetic navigation systems are used, with a localization precision of the order of centimeters, allowing the guiding of the borehole to achieve optimum objectives. This part of the process is known as pilot drilling.

After pilot drilling, the hole is widened by pushing, withdrawing the detritus by means of mud fluid injection, and then introducing a tubular drain in the gallery to take up the water through the productive strata. The openings of the drains, whether they are drills or holes, are arranged only where the productive zones are expected before placing the drain, where the ground permeability is most favorable, and in order to avoid collection from undesired zones. The end of the drain can be accessed from the seabed, in which case it is equipped with a cap that can be opened for maintenance, or it is buried slightly such that the tube remains underground and inaccessible from the seabed or sea bottom.

In the case of multiple installations, the drains would preferably be placed in a fan-like arrangement, branching from a central point of uptake on land to prevent mutual effects on the uptake to different drains.

The longitudinal profile of the drain installed can be placed at the collection point for the water on land at a lower level that the collection section, for which direct pumping will be needed to extract the water collected in the drain. The collection point can also be located on land at a greater depth than the collection section, leading to natural drainage towards the collection point, where a pumped catchpit will be placed, which could be taken advantage of for several drains in multiple uptakes.

The procedure of the invention has, therefore, the following advantages:

- Location of the collection point inland, occupying a limited space, in the event that permission is denied for occupation of the coastline itself.
- The lack of physical effect on the coastline, given that the drilling for the installation of the horizontal drains can be started from outside the coastal land area, occupying a limited amount of space.
- Lack of effect on the marine habitat and the maritime and leisure activities in the sea.
- Elimination of the need for digging out ditches in the seabed on installing the drains, avoiding rock-blasting, construction of jetties, dragging of the bed, etc., and so the physical and biological impact on the marine environment will be non-existent.
- Lack of impact of dynamic marine erosive action by waves, tides and currents on the horizontal drain, as the drain is drilled and buried in the marine substrata, and therefore protected from their reach or from its destruction.
- Collection of water with the same quality as seawater, with a constant temperature, by means of uptake from the subsoil of the seabed.
- Filtration of sea water through the permeable marine subsoil, eliminating turbidity.
- Permanent replenishment of the salt water aquifer at the sea bottom itself, thus avoiding possible creation of intruding wedges that advance inland
- Homogeneous temperature of the water taken up.

DESCRIPTION OF A PRACTICAL EMBODIMENT OF THE INVENTION

The procedure of the invention comprises:

Carrying out horizontal directional drilling 1 from behind the coastline 2, being possible from behind the Terrestrial-Maritime Line 2a below the seabed 3 until reaching the seabed by means of a final slightly upward stretch 4.

Figure 1:
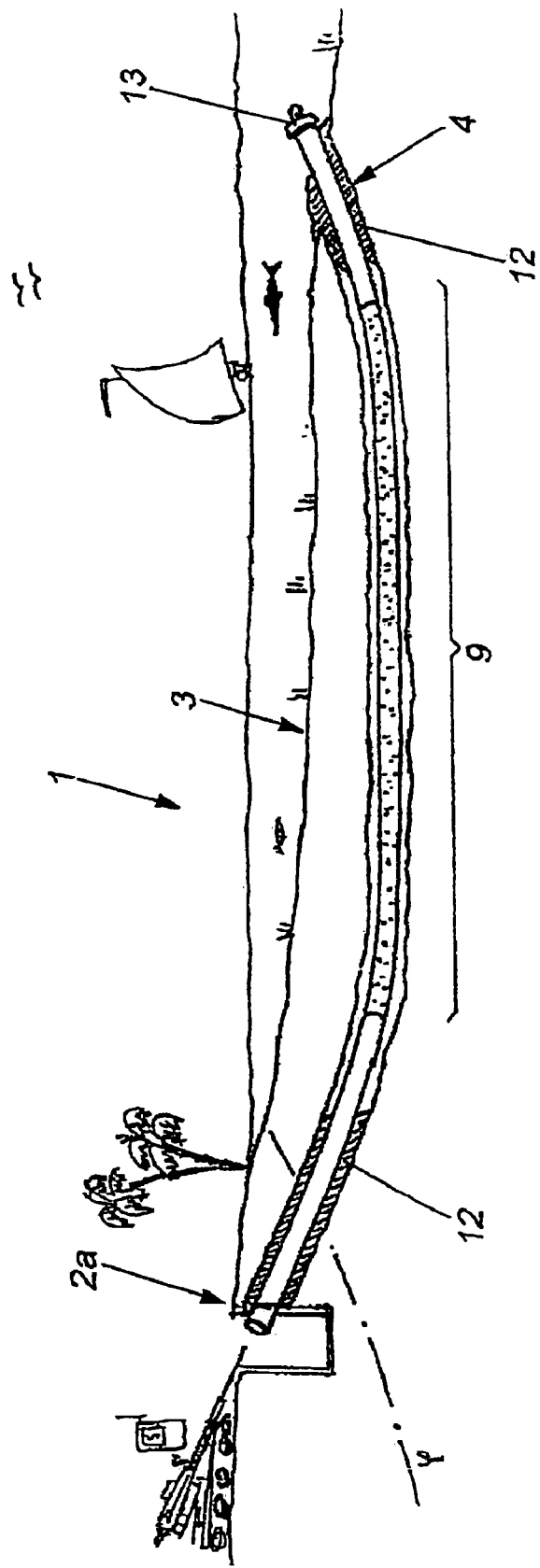
FIG. 1 shows an illustrative scheme of the drain to be installed by means of the procedure of the invention.
Figure 2:
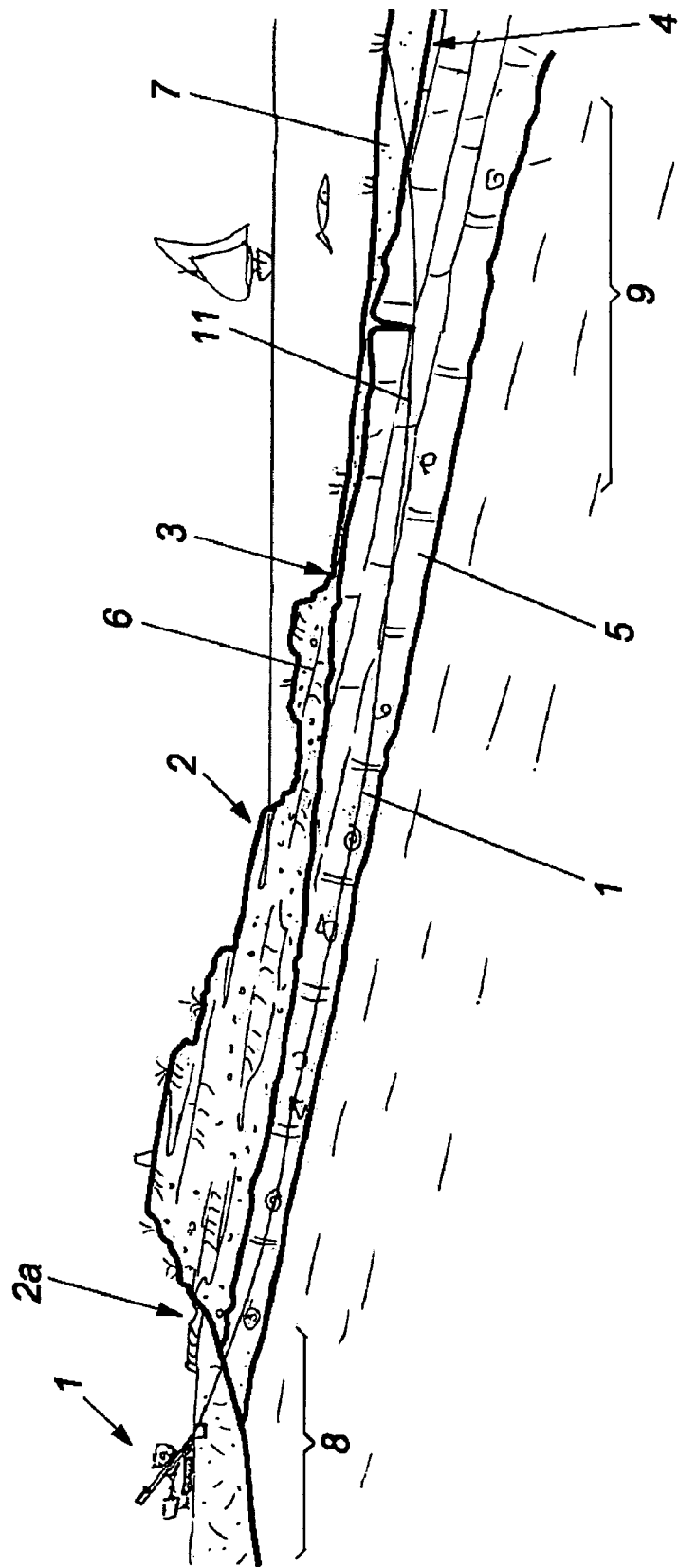
FIG. 2 shows a similar scheme to that of FIG. 1, where the geological formations are shown.

FIG. 2 shows an example of an embodiment in which the drilling is done through a productive stratum 5 of permeable rock, which lies below another stratum 6 of fairly impermeable oolitic sediment that lies along the coastline, and below a layer 7 of submerged sands, a formation which is also very permeable. It also passes through a layer 8 of fairly impermeable lime sediment, lying on land, and which contains water contaminated by agricultural activity and old lagoons rich in organic material.

In this example, the productive section 9 is located in permeable layers in direct contact with seawater.

Widening this pilot borehole, by means of a reamer 15 pushed from land towards the sea, with a front guidance system 15a within the pilot borehole and navigation system 15a for verification of the correct positioning of the reamer within the previous pilot borehole, thus managing to improve the return of mud to land and a better cleaning of the borehole, taking advantage of the widening operation.

The extraction of detritus from the drilling consists in injecting sufficient flow of drilling mud to allow circulation of flow within the drilled gallery, such that eroded materials can be transported to the point of entry, on land, thus achieving a clean drilling throughout the path.

Introducing in the borehole 10 according to the previous step a tubular drain 11, with holes or slots in the regions which correspond to a productive stretch or stretches 9, by means of HDD machinery. The drain or filter is prefabricated to the necessary length or else it is prepared on land, soldering several sections, and preparing the holes and slots in these sections, in accordance with the characteristics of the terrain and at the in the permeable sections. Once prepared, it is transported to the sea and pulled into the sea with an appropriate boat or a launch, until reaching the point of the projecting shaft that will be connected by the end open to the seabed of the gallery. The drain is connected behind the widener or reamer 15, and on withdrawing this reamer by pulling from land, the corresponding drain is simultaneously introduced until reaching the drilling machine, and so is installed within the gallery.

In this process, drilling mud will be used suitable for maintaining suspended the sand that might be present in the borehole, and which will provide lubrication of for the drain during the installation.

Pumping of the drain, for cleaning and withdrawal of the drilling mud used and the detritus (drilled material). For this work, self-priming pumping equipment will be installed on land and, if necessary, in the sea, to extract these fluids until clean water flows through the tube.

Cementing or sealing the annular space 12 between the hole and the drain in the rest of the sections other than the productive sections 9, using sulfur-resistant cement (grout) prepared with a cement and water mixer, preparing the grout to be injected. For this injection, a horizontal directional drilling apparatus with an adapted point 17a between the drain or installed tube and the drilled hole, injecting the grout 17b by means of a piston pump that forces the material to the sealing point through the shafts of the machine.

The cementing is done in regressive sense, that is, entering the drilling shafts to the point to be cemented, and progressively collecting while the necessary volume of grout is injected.

The end of the drain with access to the seabed can be equipped with a cap 13 that can be opened for maintenance, or else it can be withdrawn to a greater or lesser extent towards the inside of the gallery for subsequent burying, so that no trace remains on the seabed. This variation of the embodiment is not shown in the drawings.

Cleaning the horizontal directional drilling equipment to remove the cakes 18 the form during the drilling to seal the hole, and development of the adjacent aquifer. To remove the cakes, dispersants will normally be used, such that the pumps can perform better. The injection of dispersant and cleaning of the cake is achieved by inserting a cleaning cylinder 19 that, by means of the drilling equipment, is located in the productive areas 9 for cleaning at high pressure (greater than 50 bar).

If it is considered necessary, injection of compressed air into the drain from land will be possible in order to open up existing fractures and improve the yield of the process.

In some cases, the drain can be acidified by means of an acid to clean and open up more entry points for water and improve the yield.

Gauging of the installed drain to check the true capacity of the drain and the need for additional cleaning processes.

Figure 4:
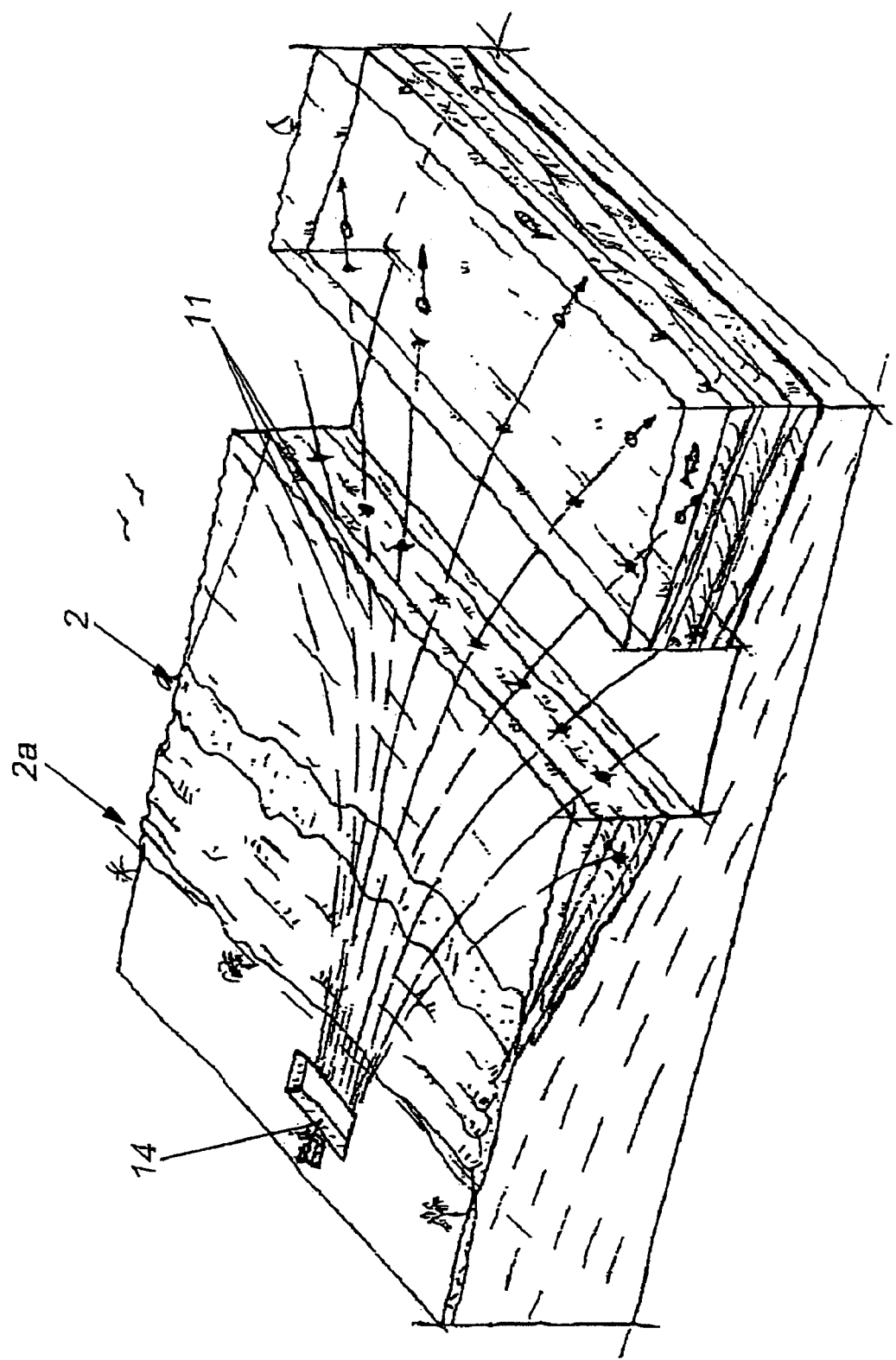
FIG. 4 shows a view of a multiple installation of drains, according to the invention.

For multiple installations, as seen in FIG. 4, the drains 11 are arranged as a fan to obtain optimum yield and with affecting mutual flows. On land, these drains converge on a pumped catchpit 14, from where the water collected will be forced towards the installations of use.

Figure 5:
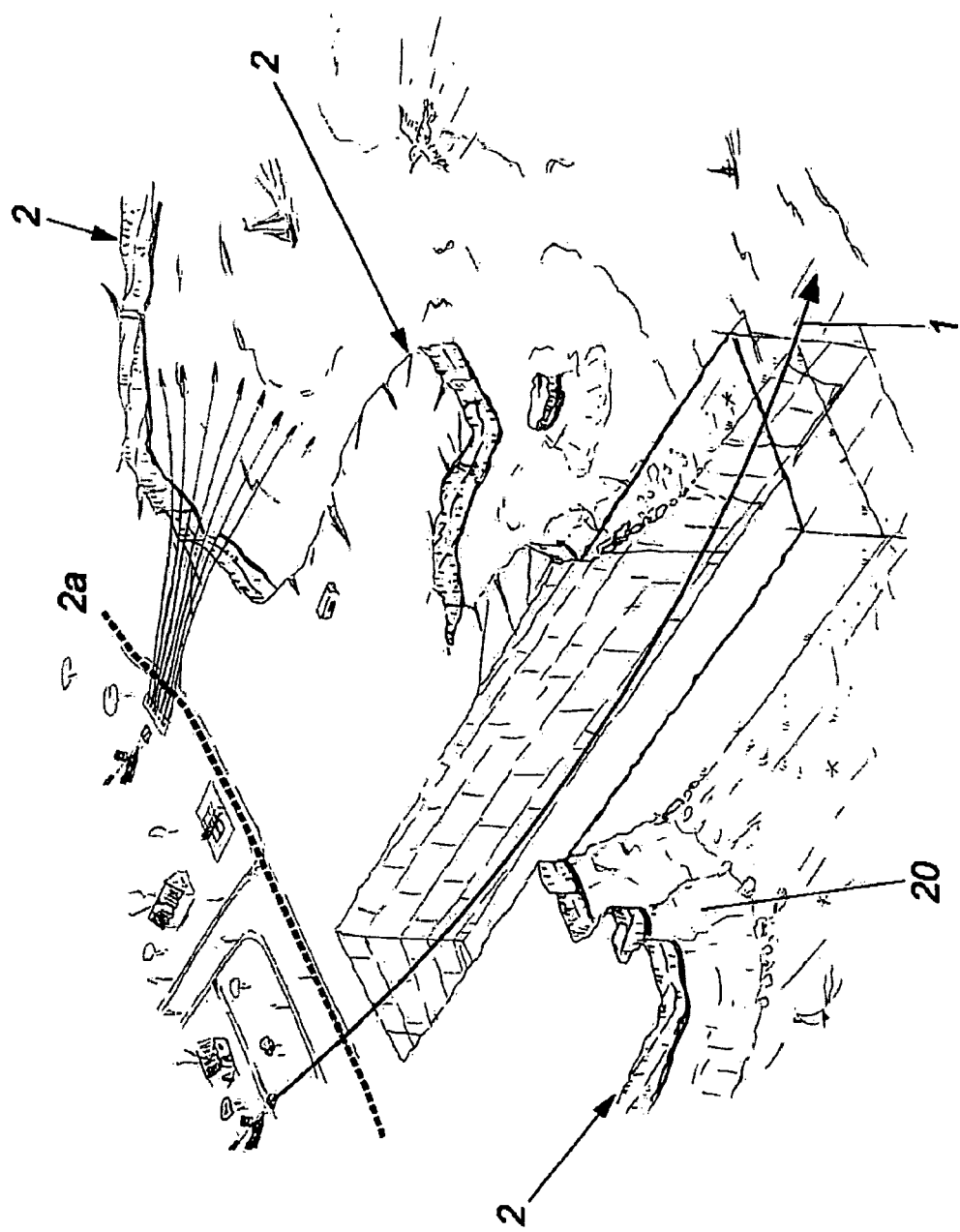
FIG. 5 shows a schematic view of a drilling of a consolidated bed (rock).
Figure 6:
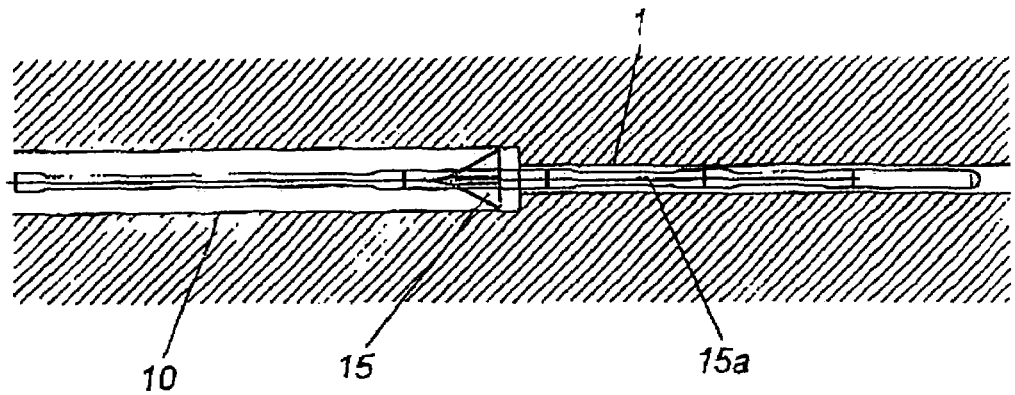
FIG. 6 shows a view in detail of the widening prior to introduction of the drain according to the invention.
Figure 7:
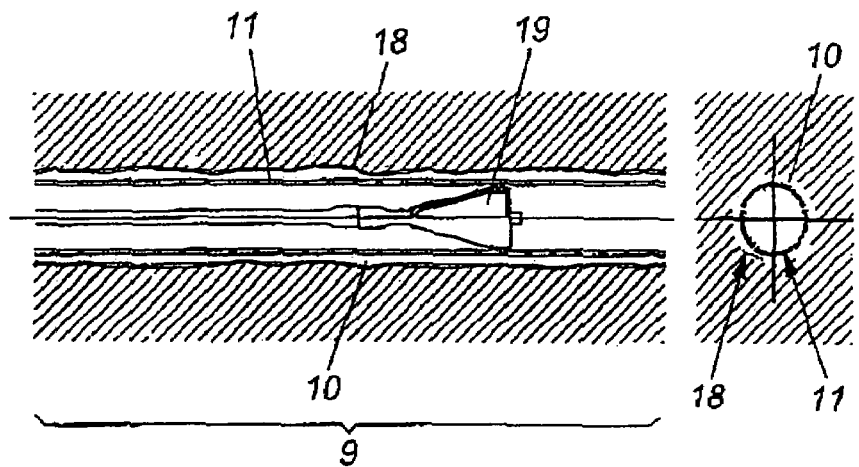
FIG. 7 shows a view in detail of the withdrawal of mud, and cleaning according to the invention.
Figure 8:
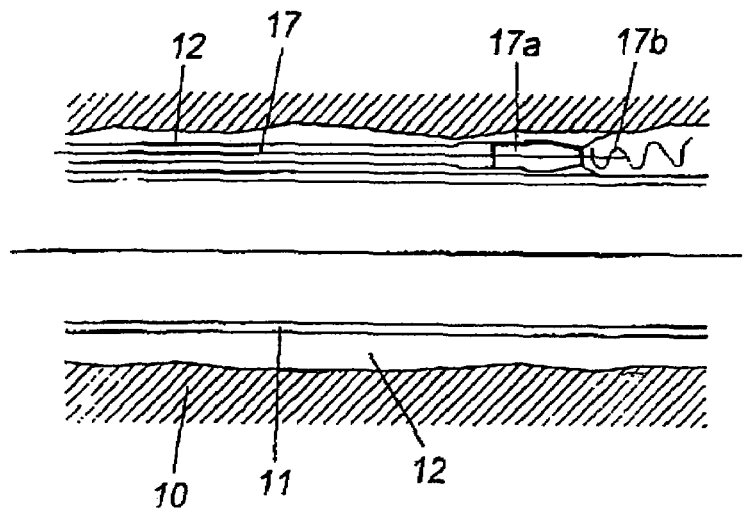
FIG. 8 shows a view of the sealing by cementing of the space between the drain and the gallery in the unproductive zones.

FIG. 5 shows that for consolidated rocky sections, the drains 11 enter the sea further on from the rocky formation 20.

Figure 3:
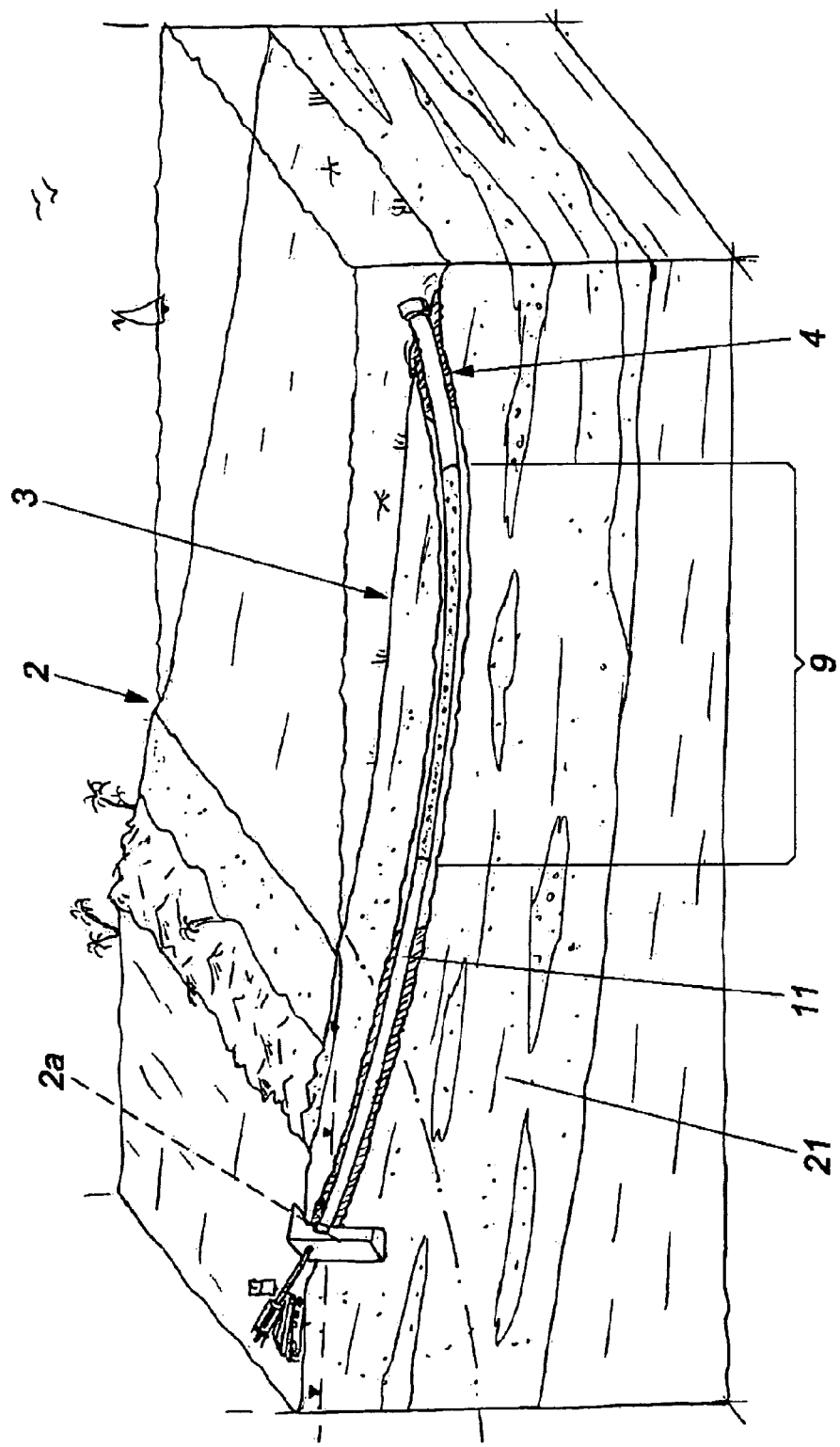
FIG. 3 shows an embodiment of the invention in unconsolidated beds (sand).

FIG. 3 shows an example for uptake in unconsolidated strata based on sand 21. In this case, the drain is introduced with the protection of a sleeve, not shown, because of the little resistance to traction of the sleeve, installing it during the drilling, for the sleeve to subsequently be withdrawn, and the space between the drain and the gallery cemented and sealed in the corresponding areas.

With the nature of the invention sufficiently described, as well as a practical embodiment thereof, it should be stated that the details of the arrangements indicated previously and shown in the accompanying figures can be modified without altering the fundamental principle.

The invention claimed is:

1. A procedure for installing horizontal drains for uptake of seawater by means of a drilling machine located behind a coastline of a sea having a seabed comprising the steps of:
   - carrying out horizontal directional drilling in a direction toward the sea of at least one pilot borehole by means of the drilling machine, said pilot borehole extending through predetermined submerged strata and finishing in a slightly upward stretch reaching the seabed;
   - widening the at least one pilot borehole by means of a reamer introduced under compression and pushed from the drilling machine towards the sea, at the same time pumping, by means of self-priming pumping equipment, a flow of drilling muds for cleaning the borehole and lubricating a tubular drain;
   - introducing the tubular drain by connecting the tubular drain to the reamer at a submerged end of the borehole and then pulling until said tubular drain reaches the drilling machine, the tubular drain comprising productive sections having openings for collection of sea water and non-productive sections having no openings, the productive sections being located other than at the end of the borehole;
   - sealing an annular space left between the borehole and the tubular drain in the non-productive sections, the sealing process being carried out by a drilling shaft which injects cement while moving regressively from the submerged end of the borehole towards the land end of said borehole; and
   - cleaning the tubular drain to remove cakes formed outside the drain during a drilling operation by means of injecting water mixed with dispersants at high pressure inside the productive sections of the tubular drain, said water escaping through the openings of said productive sections.

2. The procedure according to claim 1, wherein the reamer incorporates a magnetic navigation system.

3. The procedure according to claim 1, wherein the high pressure of the injected water mixed with dispersants is 50 bars.

4. The procedure according to claim 1, which further comprises installing a cap at the submerged end of the borehole for purposes of maintenance and cleaning.

5. The procedure according to claim 1, wherein the step of sealing is carried out by means of injecting sulphur-resistant cement in the annular space between the borehole and the tubular drain.

\* \* \* \* \*